Oct. 20, 1970 D. W. RORK 3,535,703

NON-DESTRUCTIVE READOUT MAGNETIC STORAGE ELEMENT

Filed Oct. 26, 1967 2 Sheets-Sheet 1

INVENTOR
DANNY W. RORK

BY Louis A Kline
John J. Matlago
Richard G. [illegible]
HIS ATTORNEYS

NON-DESTRUCTIVE READOUT MAGNETIC STORAGE ELEMENT

Filed Oct. 26, 1967 2 Sheets-Sheet 2

INVENTOR
DANNY W. RORK

BY Louis A Kline
John J. Matlago
Richard I. Lange
HIS ATTORNEYS

United States Patent Office 3,535,703
Patented Oct. 20, 1970

3,535,703

NON-DESTRUCTIVE READOUT MAGNETIC STORAGE ELEMENT

Danny W. Rork, Hawthorne, Calif., assignor to The National Cash Register Company, Dayton, Ohio, a corporation of Maryland Filed Oct. 26, 1967, Ser. No. 678,407
Int. Cl. G11c *11/04, 11/14*
U.S. Cl. 340—174 4 Claims

ABSTRACT OF THE DISCLOSURE

A bistable non-destructive readout magnetic storage element formed by depositing three layers of thin films on a conductive rod-like substrate. A first layer, formed of a thin film of a high coercivity isotropic ferromagnetic material, is the storage film. A second layer, formed of a lower coercivity anisotropic ferromagnetic material, is the read film. The first and second layers are separated by a third layer formed of a thin film of non-magnetic material. Encircling solenoidal windings are provided on the cylindrical substrate which permit axial magnetic switching fields to be applied to the layers of films forming a storage element. A binary digit is non-destructively read from the storage element by applying a read current pulse to a solenoidal winding for temporarily producing an axial magnetic switching field of sufficient magnitude to switch the lower coercivity read film without affecting the higher coercivity storage film. The switching of the read film generates a read-out signal which may be sensed across the encircling solenoidal winding or across the conductive substrate.

This invention relates to non-destructive read-out magnetic memory devices and more particularly to memory devices of this type formed of multilayer thin films on rod-like substrates.

It is highly desirable to provide magnetic memories for electronic digital computers which may be non-destructively read-out, i.e., the binary data stored in a memory cell can be interrogated to produce a signal indicative of its value without requiring to restore the data back into the memory cell by a restoration cycle as is usually required when data is read out of magnetic memories.

The present invention represents an improved non-destructive read-out magnetic memory in the form of multilayer films on rod-like substrates. One of the films is formed of a material having a relatively high coercivity and serves as a storage film while another one of the films is formed of a material having a relatively low coercivity and serves as the read film. These films are spaced by a third film of non-magnetic material such that the lines of force of the external field produced by axial magnetization of a portion of the storage film returns through the read film and influences the magnetization thereof. Such a rod-like configuration for a non-destructive read-out memory element is highly desirable since it makes it possible to manufacture the memory elements on an economical continuous electrodeposition process. In such process, the cylindrical substrate of a memory element can take the form of a reel of wire which can be continually advanced through a series of baths, each depositing one of the layers of the thin films. The characteristics of the thin film can be checked after each bath to insure that the proper thickness and uniformity of the film has been deposited. Furthermore, the electrical characteristics of successive portions on the wire substrate representing memory elements can be checked by passing the wire through solenoid windings. In addition, common solenoid windings as required for producing axial fields for reading or writing on memory elements spaced along a length of the wire substrate, for example, can be wound on the wire on a continuous production basis. The coated wire substrate so formed can then be cut to the desired lengths as required for forming memory arrays.

Accordingly, one of the objects of this invention is to provide a non-destructive read-out memory element having the foregoing features and advantages.

Another object of this invention is to provide a non-destructive read-out memory element formed by depositing a multilayer thin film on a rod-like conductive substrate and operating in an axial switching mode.

Other objects and features of the present invention will become apparent to those skilled in the art as the disclosure is made in the following detailed description of a preferred embodiment of the present invention as illustrated in the accompanying sheets of drawings, in which.

Figures 1, 2, 3:
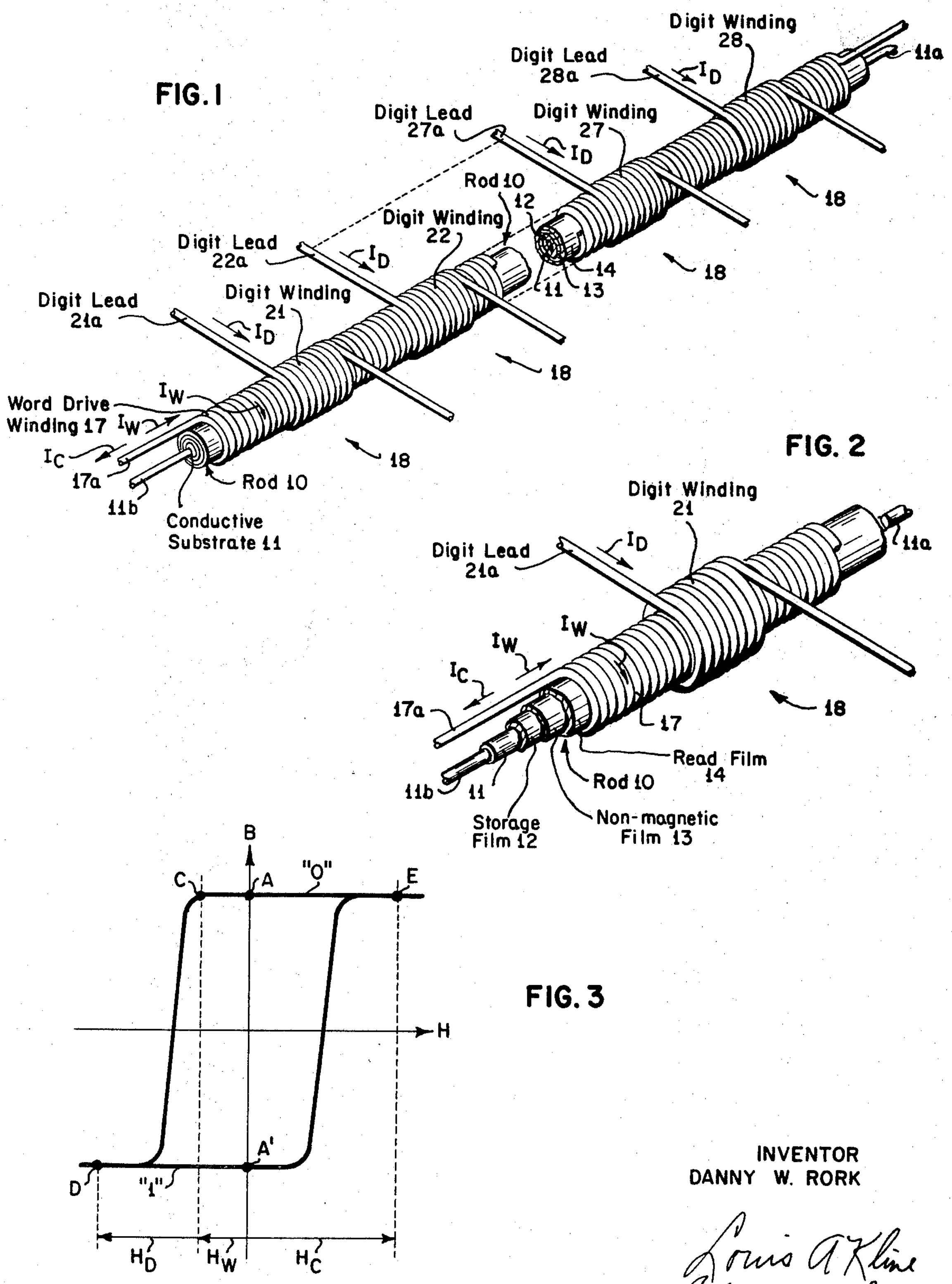
FIG. 1 is a perspective view of a plurality of magnetic memory elements of the present invention spaced along a length of rod substrate.
FIG. 2 is a perspective view of a portion of FIG. 1 showing a single magnetic memory element enlarged to illustrate the structure of the multilayer thin films on the rod substrate.
FIG. 3 is a graph illustrating the hysteresis characteristic of the magnetic storage film provided on the magnetic memory element of FIG. 2.

Referring to FIG. 1, the preferred embodiment for a plurality of storage elements 18 along a rod 10 is illustrated. The solenoid windings on the rod 10 include a word drive winding 17 wound along the full length of the rod 10 so as to be common to all the storage elements 18 and individual digit windings 21, 22,—27, 28 spaced along the rod 10 such that one of the digit windings is provided for each of the magnetic storage elements 18. A word drive lead **17*a* provides an electrical connection to word drive windings 17, and digit leads 21*a*, 22*a*—27*a*, 28*a* provide electrical connections to digit windings 21, 22—27, 8, respectively. Leads 11*a* and 11*b* provide electrical connections to the respective ends of rod 10**.

Referring now to FIG. 2, a typical magnetic storage element 18 is shown to include a portion of the rod 10 with the word drive winding 17 and one of the digit windings such as the digit winding 21. The rod 10 comprises a conductive substrate 11, a magnetic storage film 12 deposited on the substrate 11, a non-magnetic barrier film 13 deposited over the storage film 12, and a magnetic read film 14 deposited over film 13. In the preferred embodiment, the conductive substrate 11 is a beryllium copper wire having a diameter of about 10 mils. The storage layer 12 is an isotropic magnetic film of approximately 97% iron—3% nickel, by weight, having a thickness of about 4800 angstroms and a coercivity of about 14 oersteds. The non-magnetic layer 13 which separates the storage film 12 from the read film 14, is a copper film having a thickness of about 2000 angstroms. The read layer 14 is deposited in an axial magnetic field so as to produce an axially-oriented anisotropic Permalloy film of approximately 80% nickel and 20% iron, by weight, having a thickness of about 8000 angstroms and a coercivity of about 2 oersteds. As will be discussed in the ensuing description in connection with FIG. 4, the read film 14 is coupled to the axial field of the storage film 12 in the storage unit 18 such that the remanent state of the read film 14 is controlled by the state of the storage film 12. The coercivity of the magnetic storage film 12 is sufficiently high with reference to the coercivity of the magnetic read film 14 so as to permit a read current pulse applied to one of the digit windings or the word drive winding to momentarily change the magnetic state of the read film 14 by overriding the magnetic coupling of the storage film 12, but without having any affect on the magnetic state of the film 12. Leads 11*a* and 11*b* provide electrical connections to the respective ends of the conductive substrate 11 of the rod 10 and can be used for sensing a change in remanent magnetization of the read film 14.

Figure 4:
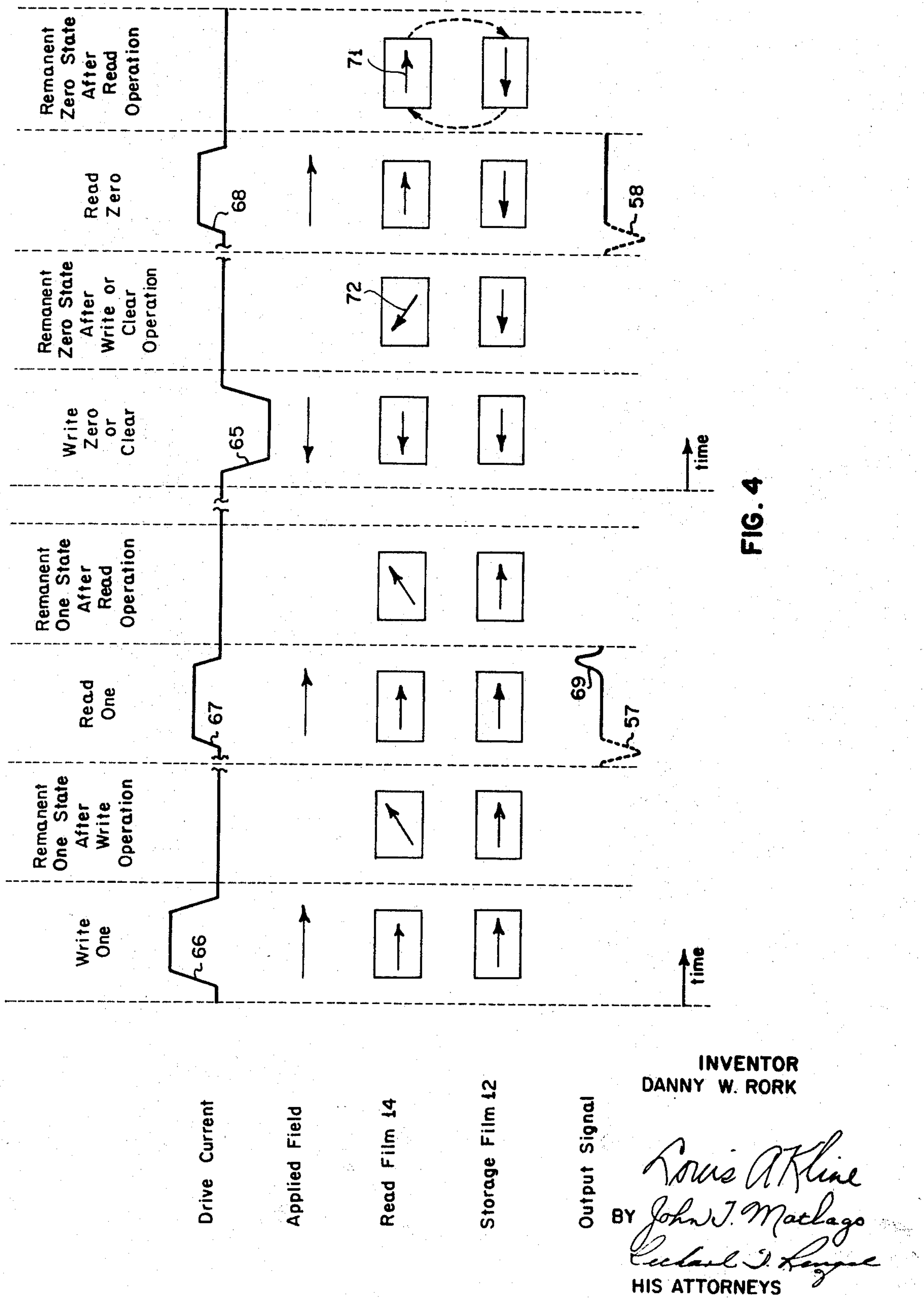
FIG. 4 illustrates the states of the magnetic films provided on the magnetic memory element of FIG. 2 as a result of the read and write operations.

Each magnetic storage element 18 includes the portion of the rod 10 in the immediate vicinity of each of the digit windings 21 to 28 as shown in FIG. 1. It will be understood that the magnetic storage film 12 provided on the rod 10 has a rectangular hysteresis characteristic and an elemental portion thereof, such as the portion shown in FIG. 2, may be switched in two directional states of saturation in the axial direction of the rod 10 by simultaneous currents applied to one of the digit leads 21*a*, for example, and to the word drive winding lead 17*a*, changing the magnetic direction of the storage film 12 by domain wall switching. The read film 14 is coupled to the storage film 12 so that the magnetic field created by the remanent state of the storage film 12 changes the remanent magnetic direction of the read film 14 for each storage element 18 to a skewed position if the two films 12 and 14 are forced into the same parallel magnetic direction by a drive current 66, as illustrated in FIG. 4. The magnetic direction of the read film 14 changes by a combination of domain wall and rotational switching which results from plating the Permalloy material for film 14 in an axial magnetic field. The switching of the read film 14 produces changing magnetic fields in directions both axial and normal to the substrate 11 and consequently generates signals which may be detected at lead 11*a* of the substrate 11, lead 17*a* of the word driving winding 17 and leads 21*a*, 22*a*—27*a*, 28*a* of the digit windings 21, 22—27, 28 of the respective storage elements 18. The signals generated at lead 17*a* are equivalent in significance to the signals generated at lead 11*a* and may alternatively be used in equivalent systems embodying the storage elements 18 arranged as shown in FIG. 1. The use of the signals at digit leads 21*a*, 22*a*—27*a*, 28*a* will be further considered when the non-destructive readout of the storage element 18 is described.

Referring to FIG. 3 showing a graph of the hysteresis characteristic of the magnetic storage film 12, it will now be described how binary data may be written into each of the magnetic storage elements 18 shown in FIG. 1 by changing the magnetic direction of the storage film 12 to a binary state corresponding to the binary digit "1" or "0."

Each bistable magnetic storage elements 18 will reside at or near point A for a "0" state and point A' for a "1" state. A write operation is commenced by first clearing all the magnetic storage elements 18 of FIG. 1 with a clear current pulse $I_C$ applied to word lead 17*a* producing the switching field $H_C$ shown in FIG. 3 and driving all the magnetic storage elements 18 into the "0" saturation remanent state, as indicated as point E in FIG. 3. The storage elements 18 in the "1" state prior to the application of current $I_C$, are driven to the "0" state, i.e., from point A' to point E in FIG. 3 by the switching field $H_C$. On the other hand, the magnetic storage elements 18 already in the "0" state prior to the application of current pulse $I_C$, are merely driven from point A to point E in the same "0" saturation state. Momentarily referring to FIG. 4, it is shown that when a clear pulse 65 is applied, the magnetic storage film 12 is switched to a "0" state as schematically illustrated, and assumes the remanent "0" state as shown.

From the prior explanation of the clearing operation, it will be understood that after the application of current pulse $I_C$ to word lead 17*a*, each of the magnetic storage elements 18 common to the word drive winding 17 in FIG. 1 will reside in the "0" state at point A regardless of its previous magnetic state. To perform the write operation, a current $I_W$ is applied to the word drive lead 17*a* producing the magnetic field $H_W$ indicated in FIG. 3, which field drives the magnetic storage elements 18 from point A to point C, a substantial step towards the "1" state but still not sufficient by itself to change the state of the storage elements 18 shown in FIG. 1. When a "1" is to be written, the additional magnetic field $H_D$ required to switch the element is provided by applying a digit current $I_D$ to the lead of the digit winding of the element to drive the element the remaining way to the "1" state, as indicated as point D in FIG. 3, the element then returning to point A' when the current pulses $I_W$ and $I_D$ are terminated. Momentarily referring to FIG. 4 again, it is seen that when a current pulse 66, which may, for example, represent the sum of current pulses $I_W$ and $I_D$, is applied, the magnetic storage film 12 is switched to a "1" state as schematically indicated and following the termination of the pulse assumes the remanent "1" state as shown.

It should be obvious that in the above described mode of operation if a "0" is to be written into into a storage element 18 after a clear operation and during a write operation, no digit current is applied to the corresponding digit leads 21*a*, 22*a*–27*a* or 28*a*, and a magnetic storage element 18 is driven only to point C by the field $H_W$ produced by the write current $I_W$, and the storage element 18 remains in the "0" state and returns to point A when the current pulse $I_W$ applied to the word drive lead 17*a* is terminated. From this description, it will be understood that in the preferred embodiment of the storage element herein described, during a write operation the current $I_W$ is always applied to the word lead 17*a*, but the digit current $I_D$ is applied to the digit leads 21*a*, 22*a*–27*a* or 28*a* only a "1" is to be written into the corresponding magnetic storage elements 18.

Having considered how the data is written into the storage element 18, it will now be described how the data in the storage elements 18 of FIG. 1 are read out. The contents of the storage elements 18 are read non-destructively, i.e., the storage elements 18 described herein have a non-destructive readout capability and do not require that the data be written back into them to preserve the data. A read current pulse 67 as shown in FIG. 4 is applied to the word drive lead 17*a* which conditions the read film 14 by aligning the film 14 of each storage element 18 having a stored "1" to the applied field created by the current pulse. At the completion of the current pulse, the coupling effect of the storage film 12 will skew the direction of magnetization of the read film 14 of those storage elements 18 having films 12 and 14 whose magntization have been forced by the read pulse into the same parallel direction, as shown in FIG. 4. The directional changes resulting from the skewing of the directional magnetic state of the read film 14 at the termination of a read current pulse applied to word drive lead 17*a* generates signals at digit leads 21*a*, 22*a*–27*a*, 28*a* of the respective storage elements 18 storing a digit "1."

The reading of a stored digit from a storage element 18 will now be more particularly described with reference to FIG. 4 showing the magnetic states of films 12 and 14 before, during and after read pulses 67 and 68 are applied. Read pulses 67 and 68 preferably have short fall times; they can exist for any length of time but are preferably of momentary duration. When a "1" is written into a storage element 18 by a write current pulse 66, the resultant applied field forces the magnetic direction of films 12 and 14 to be aligned as shown in FIG. 4. At the completion of the current pulse 66, the films 12 and 14 assume the remanent one state of FIG. 4 where it is seen that the coupling between the films 12 and 14 has resulted in the skewing of the magnetic direction of the read film 14. A read current pulse 67 is applied to word drive lead 17*a* to condition the read film 14 by aligning the magnetic direction of film 14 parallel to that of film 12 and in the direction shown, it being understood that any signals 57 generated on digit leads 21*a*, 22*a*, etc. at this time are incidental to the read operation in that they would not be sensed by sense amplifiers connected to the digit lines of the respective elements in a typical memory arrangement. The coupling effects of the storage film 12 of the storage elements 18 having a stored "1," again skews the magnetic direction of the read film 14 at the termination of pulse 67 generating signal pulses 69 on digit leads 21*a*, 22*a*–28*a*, 28*a* of the respective storage elements 18 having a stored "1." Even though the change in magnetic direction may be small, the signal output from the digit windings 21 through 28 can be made quite large since the voltage induced therein is proportional to the time rate of change of the magnetic flux ($d\phi/dt$) due to change of magnetic direction rather than merely the amount thereof. These signals 69 would be sensed by sense amplifiers and when so sensed would indicate a binary "1" has been read out of the respective memory elements. When a storage element 18 is cleared by a current pulse 65, the resultant applied field causes the magnetic films 12 and 14 to be aligned in the same direction as shown in FIG. 4. The magnetic direction of the film 14 is skewed at the termination of the pulse 65 due to the previously described coupling effect of film 12, as shown by the remanent state following pulse 65 in FIG. 4. A read current pulse 68 applied to word drive lead 17*a* aligns the magnetic direction of film 14 opposite to that of film 12, as shown in FIG. 4, generating signals 58 on digit leads 21*a*, 22*a*, etc. of the respective storage elements 18 having a stored "0." The signals 58 are incidental to the read operation, in that they would not be sensed by sense amplifiers. The films 12 and 14, connected to the respective elements having opposite directional states as a result of pulse 68 will retain these same states as indicated in FIG. 4 and no signal will be generated after the termination of pulse 68. It should be noted that with the films in this condition a subsequent read pulse would not produce a signal, such as spurious signal 58 produced by current pulse 68, as the read film 14 is already aligned to the applied field that would be produced by such a pulse. The storage elements 18 shown in FIG. 1 having a stored "0" will thus not generate a signal after the termination of a read pulse at respective digit leads 21*a*, 22*a*–27*a*, 28*a*, thus indicating to the respective sense amplifiers that a digit "0" has been read. In the manner described, parallel readout of the storage elements 18 common to the word drive winding 17 in FIG. 1 is obtained by applying a read current pulse to word drive lead 17*a* and detecting the presence of signals following said pulse on digit leads 21*a*, 22*a*–27*a*, 28*a* of the respective storage elements 18 having stored "1's," it being understood that the storage elements 18 having a stored "0" will not generate a pulse at that time at their respective digit leads 21*a*, 22*a*–27*a*, 28*a*.

In the described embodiment, the read film 14 may have either one of the two remanent zero states 71 and 72 shown in FIG. 4. Following the read pulse 68, the read film 14 will be in the remanent state 71 aligned with the flux path through the read film 14 produced by the magnetization of the storage film 12. The read film 14 will remain in this remanent state 71 following subsequently applied read pulses. It should be noted that after the first read pulse 68 following a write zero or clear pulse 65, an unsensed output signal, such as pulse 58, will not be generated by a subsequent read pulse. It should be understood that in a memory system it would be possible to have the write zero pulse 65 followed by a conditioning pulse, such as pulse 68, and thereby condition the read film 14 to reside in the remanent zero state 71. The stored digit zero may then be read using the output signal generated by the leading edge of the read pulse, where the presence of a signal, e.g., signal 57, denotes a stored "1" and the absence of a signal denotes a stored "0."

From the above description, it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages. It is to be understood that the invention is not limited to the specific features shown, but that the means and construction herein disclosed comprise the preferred form of several modes of putting the invention into effect, and the invention is, therefore, claimed in any of its forms or modifications within the legitimate and valid scope of the appended claims.

What is claimed is:

1. The combination of bistable magnetic thin films for non-destructive readout storage elements comprising: a plurality of concentric and circumferentially continuous layers including at least one storage layer and at least one read layer formed from magnetic materials having remanent states and at least one layer of non-magnetic material separating said storage layer and said read layer, said storage and read layers being formed from magnetic materials of relatively high and low coercivity, respectively, to provide different degrees of remanence for the respective storage and read layers whereby either remanent state of said storage layer is substantially not affected by the intensity of magnetic fields required for changing the remanent state of said read layer during readout thereof, wherein said read layer has an easy axis parallel to an axis for said plurality of concentric layers, and wherein the remanent state of said storage thin film is axial and the magnetic field produced by said storage thin film displaces the magnetic direction of the read thin film from said easy axis whenever said storage and read thin films are placed in remanent states having the same magnetic direction.

2. A non-destructive readout storage element as in claim 1 wherein said storage layer is deposited as a thin film on a conductive wire substrate and including at least one solenoidal winding encircling said storage element to permit an axial magnetic switching field to be applied to the thin films on said substrate and wherein sensing means is connected to the ends of said substrate for sensing changes in the magnetization direction of the read layer.

3. The invention in accordance with claim 2 including an additional encircling solenoidal winding, and sensing means connected to said additional solenoidal winding.

4. The invention in accordance with claim 3, wherein said substrate is formed of copper beryllium wire; said storage layer is an electrodeposited thin film on said wire and composed of about 97% iron and 3% nickel; said one layer of non-magnetic material is an electrodeposited thin film of copper; and said read layer is an electrodeposited thin film composed of about 80% nickel and 20% iron.

References Cited

UNITED STATES PATENTS

| | | | |
|---|---|---|---|
| 3,125,743 | 3/1964 | Pohm et al. | 340—174 |
| 3,213,431 | 10/1965 | Kolk et al. | 340—174 |
| 3,315,241 | 4/1967 | Meier | 340—174 |
| 3,350,180 | 10/1967 | Croll | 29—183.5 |
| 3,370,979 | 2/1968 | Schmeckenbecher | 117—217 |

OTHER REFERENCES

"Non-Destructive Read-Out Memory Cell" by Terman, Spampinato and Sie, IBM Tech. Disc. Bulletin, vol. 8, No. 11, April 1966, p. 1598.

JAMES W. MOFFITT, Primary Examiner